Nov. 13, 1934.  A. BEVACQUA  1,980,741
PISTON AND CYLINDER ASSEMBLY
Filed Feb. 11, 1931  2 Sheets-Sheet 1
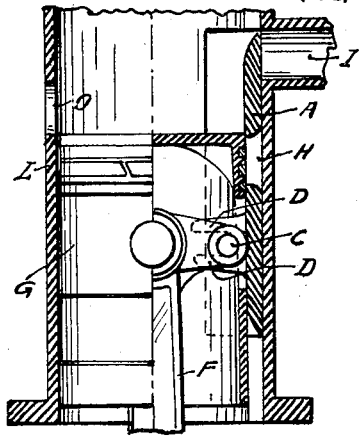
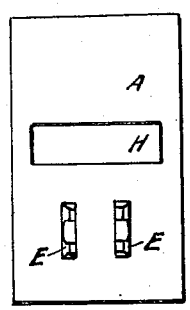
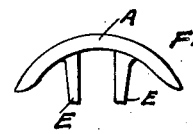
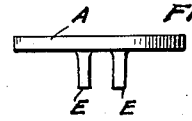
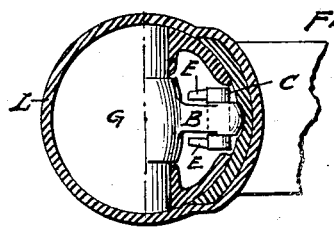
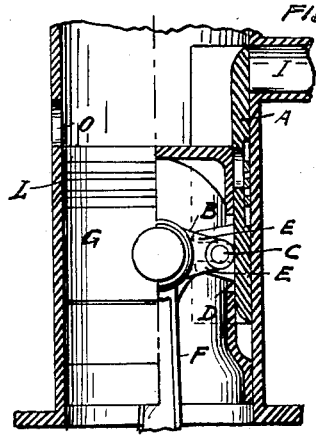
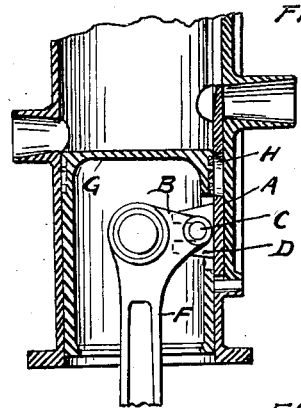
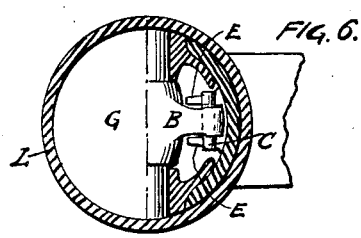
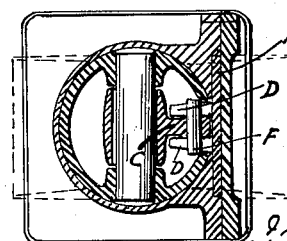

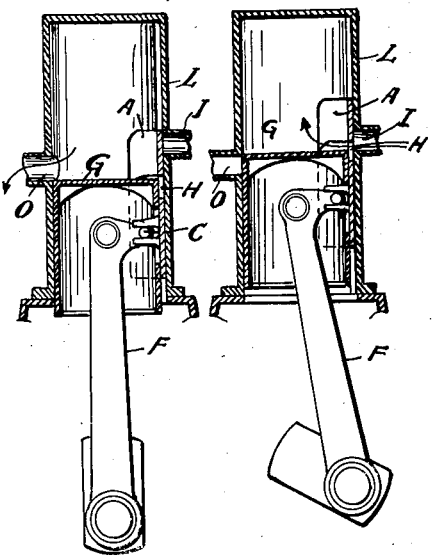
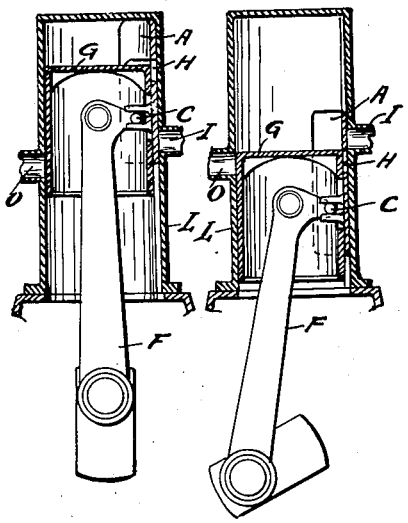

Patented Nov. 13, 1934

1,980,741

UNITED STATES PATENT OFFICE 1,980,741

PISTON AND CYLINDER ASSEMBLY

Aldo Bevacqua, Milan, Italy

Application February 11, 1931, Serial No. 515,122
In Italy March 7, 1930

5 Claims. (Cl. 123—47)

The arrangement described hereinafter relates to piston engines and has for its object, to obtain the inlet and outlet of the fluid without employing any operated valves. This result is achieved by interposing a sliding member between the cylinder surface and the piston surface, the sliding member being endowed with a reciprocating motion in the same direction as the piston motion, and being displaceable relatively to the piston as a consequence of the angular displacements of the head of the connecting rod.

The arrangement is illustrated in some of its embodiments by the accompanying drawings, in which:

Figs. 1 and 2 illustrate one embodiment of the invention in axial, and lateral cross section, respectively, the cylinder and piston being shown partly in view and partly in section, while the sliding member is shown in section.

Figs. 3 and 4 show the sliding member in front view and plan respectively.

Figs. 5 and 6 are similar views to those of Figs. 1 and 2 and represent a second embodiment.

Figs. 7 and 8 represent a third embodiment.

Fig. 9 shows in plan the sliding member shown in Figs. 7 and 8.

Figs. 10, 11, 12, 13 diagrammatically show four different positions occupied by the piston G and by the distributing sliding member A during the revolution of the crank shaft.

The slide A, contacting with the cylinder surface and to the external lateral surface of the piston, is actuated by an extension B forming part of the connecting rod F and disposed normally to the axis of this rod. The extension B, by effect of the motion of the head of the connecting rod connected to a crank, performs angular displacements which can be calculated and which force the slide A to travel along the outer surface of the piston G and the inner surface of the cylinder L by the amount which, in its aggregate, is sufficient to uncover or cover the inlet opening I or the outlet opening O. For this purpose, the extension B is arranged between two fork-shaped arms E fixedly secured to the slide A and extending through a slot D formed in the lateral piston surface. A pin C carried by the said extension B engages the fork arms.

For the purpose aimed at, it is immaterial whether the slide A be recessed in the lateral surface of the piston G (Figs. 5, 6) or in the lateral surface of the cylinder L in which the piston reciprocates (Figs. 1, 2) or whether the slide be arranged at the outside of the cylinder L (Figs. 7, 8).

With reference to Figs. 10 to 13 illustrating the working of the arrangement, I is the inlet and O the outlet opening.

The arrangement is so devised that one of the two openings is uncovered when the other is covered. Namely, when starting its upward stroke and passing from the position indicated in Fig. 10 to that indicated in Fig. 11, the piston covers the outlet opening O while the slide A, owing to the angular movement of the connecting rod F and extension B thereof, is obliged to displace itself along the piston surface until it uncovers its own opening H relatively to the piston.

Simultaneously, due to the movement of the piston G, the slide opening H is carried opposite the inlet opening I. The combined construction of the piston and slide, performing its upward stroke and passing from the position indicated in Fig. 11 to that indicated in Fig. 12, closes the inlet opening I and keeps it closed through the complete duration of the downward piston stroke. This occurs because, during the downward stroke the connecting rod F, with its lateral displacement, forces the slide A to glide along the lateral surface of the piston in a downward direction and the piston, by tightly covering the slide opening H, holds the inlet opening I in closed condition (Figs. 13 and 10).

The arrangement described above is applicable: (1) to all steam engines; (2) to all internal combustion engines; (3) to all hydraulic and pneumatic pumps.

Having now particularly described and ascertained the nature of my said invention and in what manner the same is to be performed, I declare that what I claim is:—

1. In the combination of a fluid motor, a cylinder, a piston reciprocable in said cylinder, an actuating member for said piston, inlet and outlet ports in said cylinder, a segmental slide reciprocable in the direction of said piston for controlling only one of said ports, an extension fixed to said actuating member for operating said slide, a port in said slide adapted to register with the port in the cylinder controlled thereby, said actuating member and extension adapted to operate said piston and slide upon the admission stroke of the engine to uncover said port in said slide at the time of registry thereof with the port in the cylinder controlled thereby, and upon the exhaust stroke to cover said port in said cylinder by the piston and slide assembly, the other one of said ports in said cylinder being controlled only by said piston.

2. In the combination of a fluid motor, a cylinder, a piston reciprocable in said cylinder, a recess intermediate said piston and cylinder, an actuating member for said piston, inlet and outlet ports in said cylinder, a segmental slide disposed in said recess reciprocable in the direction of said piston for controlling the inlet port, an extension fixed to said actuating member for operating said slide, a port in said slide adapted to register with the inlet port in the cylinder controlled thereby, said actuating member and extension adapted to operate said piston and slide upon the admission stroke of the engine to uncover said port in said slide at the time of registry thereof with the inlet port in the cylinder while the piston closes the outlet port in said cylinder.

3. In the combination of a fluid motor, a cylinder, a piston reciprocable in said cylinder, a recess intermediate said piston and cylinder, an actuating member for said piston, inlet and outlet ports in said cylinder, a segmental slide disposed in said recess reciprocable in the direction of said piston for controlling the inlet port, an extension fixed to said actuating member for operating said slide, a port in said slide adapted to register with the inlet port in the cylinder controlled thereby, said actuating member and extension adapted to operate said piston and slide upon the admission stroke of the engine to uncover said port in said slide at the time of registry thereof with the inlet port in the cylinder while the piston closes the outlet port in the cylinder, and upon the exhaust stroke to cover said inlet port in said cylinder by the piston and slide assembly, while the piston uncovers the outlet port.

4. In the combination of a fluid motor, a cylinder, a piston reciprocable in said cylinder, a recess intermediate said cylinder and piston, an actuating member for said piston, inlet and outlet ports in said cylinder, a segmental slide disposed in said recess reciprocable in the direction of said piston for controlling one of said ports, an extension fixed to said actuating member for operating said slide, a port in said slide adapted to register with the port in the cylinder controlled thereby, said actuating member and extension adapted to operate said piston and slide upon the admission stroke of the engine to uncover said port in said slide at the time of registry thereof with the port in the cylinder controlled thereby, and upon the exhaust stroke to cover said port in said cylinder by the piston and slide assembly, the other one of said ports in said cylinder being controlled only by said piston.

5. In the combination of a fluid motor, a cylinder, a piston reciprocable in said cylinder, an actuating member for said piston, inlet and outlet ports in said cylinder, a segmental slide reciprocable in the direction of said piston for controlling only one of said ports, an extension fixed to said actuating member for operating said slide, a port in said slide adapted to register with the port in the cylinder controlled thereby, said actuating member and extension adapted to operate said piston and slide in such a manner that the stroke of the slide leads the stroke of the piston in both directions of movement whereby the port in said slide is uncovered at the time of registry thereof with the port on the cylinder controlled thereby during the admission stroke of the engine, and during the exhaust stroke the port in said slide is covered, with only the piston controlling the closing and opening of the other one of said ports in said cylinder.

ALDO BEVACQUA.